June 2, 1964   L. H. FOSTER ETAL   3,135,316
CONVERTIBLE HEATING AND COOLING FOOD STORAGE CABINET
Filed Sept. 2, 1960   4 Sheets-Sheet 1

INVENTORS
LAWRENCE H. FOSTER
HAROLD E. BUSH

BY
Curtis, Morris & Safford
ATTORNEYS

INVENTORS
LAWRENCE H. FOSTER
HAROLD E. BUSH

BY Curtis, Morris & Safford
ATTORNEYS

United States Patent Office 3,135,316
Patented June 2, 1964

3,135,316
CONVERTIBLE HEATING AND COOLING
FOOD STORAGE CABINET
Lawrence H. Foster, Scarsdale, and Harold E. Bush, Hudson, N.Y., assignors to Foster Refrigerator Corp., Hudson, N.Y., a corporation of New York
Filed Sept. 2, 1960, Ser. No. 53,839
11 Claims. (Cl. 165—12)

The present invention relates to a cabinet for storing food, or the like, and more particularly to a system which may be adjusted by the flick of a switch to produce either heating, cooling or freezing temperatures in the cabinet.

There are many places, such as in the kitchen of a restaurant, hotel, or hospital, where it is desirable to maintain food either heated for serving, refrigerated for serving, or frozen for storage. Many times it is desirable to store food products in a frozen condition until a certain time and then thaw the food for cooking. It is a common practice to provide separate heating, refrigerating and freezing cabinets for this purpose. However, the space in a particular cabinet of such an installation is limited to its particular heating, cooling or freezing function. As a result, certain of the cabinets may be idle while other cabinets are overloaded. Also, when frozen articles of food are to be thawed quickly, it is necessary to transfer the articles from one cabinet to another.

One of the objects of the present invention is to provide a convertible food storage compartment which may be maintained at different temperatures in a range from below 0° F. to over 200° F. and immediately shifted from operation at one temperature to operation at another temperature.

Another object is to provide a system for producing either heating, refrigerating or freezing temperatures in a food storage compartment by merely operating a single switch.

Another object is to provide a cabinet having separate food storage compartments which may be operated simultaneously at the same or different temperatures and selectively controlled by a switch for the particular compartment.

Another object is to provide an improved heating and cooling system and control for use with a food storage cabinet to selectively heat, cool or freeze in any one of a plurality of separate compartments therein.

Still another object is to provide a convertible food storage cabinet of the type indicated which is of a simple and compact construction, economical to manufacture and one which is reliable in operation.

These and other objects will become more apparent from the following description and drawings in which like reference characters denote like parts throughout the several views. It is to be expressly understood, however, that the drawings are for the purpose of illustration only and are not a definition of the limits of the invention, reference being had for this purpose to the appended claims.

Figure 1:
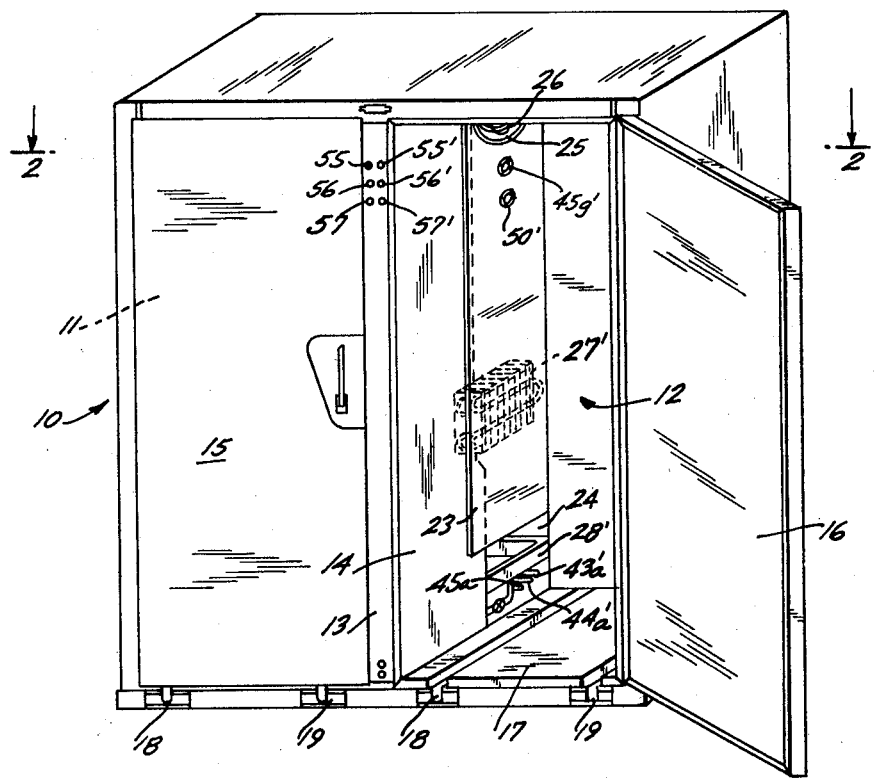
FIGURE 1 is a perspective view of a cabinet having separate compartments and incorporating the present invention to individually heat, cool or freeze in the separate compartments.
Figure 2:
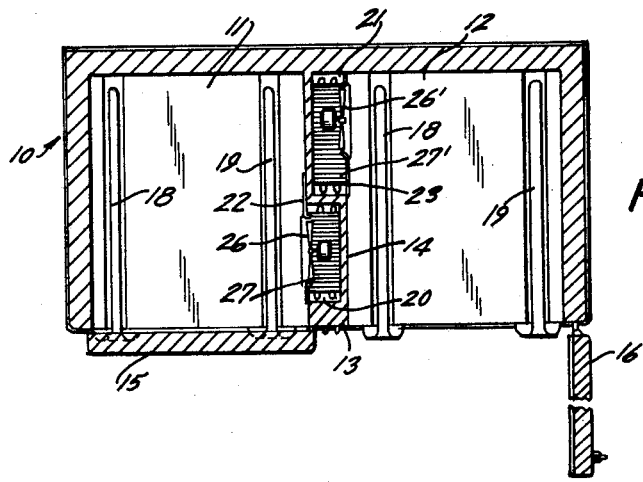
FIGURE 2 is a transverse sectional view taken on line 2—2 of FIGURE 1 and showing the heat transfer units positioned in recesses in the individual compartments formed by the transverse partition wall of the cabinet.

Referring to FIGURES 1 and 2 of the drawings, the invention is shown applied to a cabinet 10 having separate food storage compartments 11 and 12. It is to be understood, however, that the present invention can be applied to a cabinet having a single compartment or any desired number of compartments. In the embodiment of the invention illustrated in FIGURES 1 and 2, the cabinet 10 has a central mullion 13 which cooperates with the top, bottom and side walls to form separate door openings. A transverse partition 14 extends rearwardly from the mullion 13 to the rear wall of the cabinet to divide the cabinet into the separate compartments 11 and 12 and each compartment may be opened and closed individually by the doors 15 and 16, respectively. The walls of the cabinet 10 including the partition wall 14 are formed of or contain an insulating material to insulate the compartments 11 and 12 from each other and from the ambient. The bottom wall 17 of each compartment 11 and 12 is provided with recessed tracks 18 and 19 for receiving and guiding the casters of mobile racks for carrying articles of food so that the racks may be rolled into and out of the cabinet. The recessed track construction is described and claimed in a copending application for Letters Patent of Lawrence H. Foster and Harold E. Bush, Serial No. 34,468, filed June 7, 1960, now Patent No. 3,058,320, granted October 16, 1962.

As shown in FIGURE 2, the transverse partition 14 is offset midway between the front and rear walls of the cabinet 10 to provide recesses 20 and 21 in the adjacent sides of the respective compartments 11 and 12. Overlying the open front of the recesses 20 and 21 are baffles 22 and 23, respectively. The lower end of each baffle 22 and 23 is positioned above the floor 17 to provide an opening 24 at the bottom of each recess, see FIGURE 1, and each baffle has a circular opening 25 adjacent the top in which an electric motor operated fan 26 is mounted. Thus, the recess 20 and baffle 22 in compartment 11 and the recess 21 and baffle 23 in compartment 12 form flues at one side of the compartments through which air is circulated by the fans 26. Heat transfer units 27 and 27' for either heating or cooling are mounted in the flues in the respective compartments 11 and 12 to individually heat or cool its particular compartment. Underlying the heat transfer units 27 and 27' in the respective compartments 11 and 12 are drain pans 28 and 28' for receiving and draining water when the units are defrosted.

Figure 3:
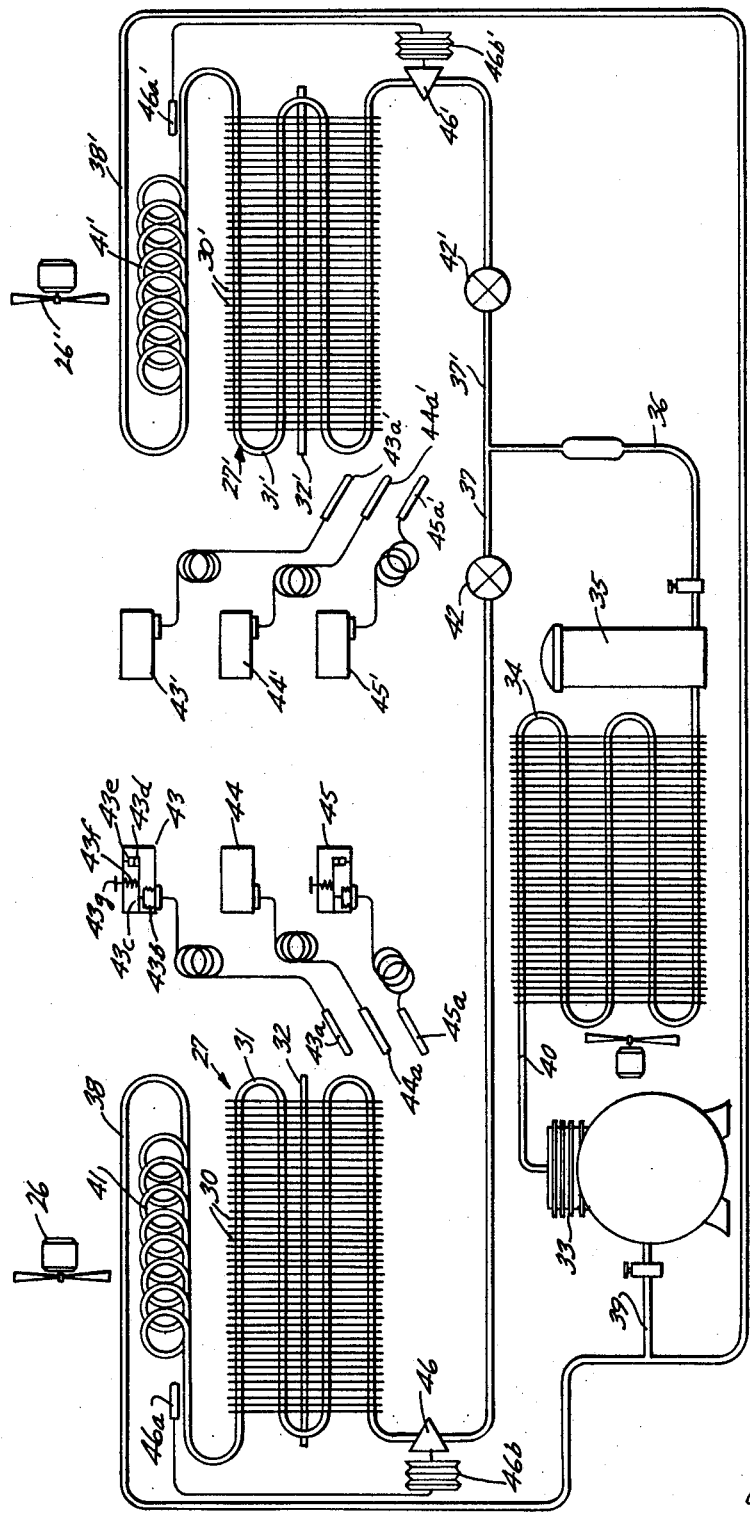
FIGURE 3 is a diagrammatic view of the system for individually heating, cooling or freezing in the separate compartments of the cabinet.

As shown in FIGURE 3, each heat transfer unit 27 and 27' comprises a plurality of spaced heat transfer fins 30 with each having a refrigerant evaporating coil 31 or 31' extending sinuously in heat exchange relation with the fins and an electric heating element 32 or 32' positioned between sections of the evaporating coils in heat exchange relation with the fins. Thus, when refrigerant is supplied to the evaporator coil 31 or 31', the respective compartment 11 or 12 is refrigerated; and when electric current is supplied to the heating element 32 or 32' the respective compartment is heated.

As shown in FIGURE 3, the separate evaporator coils 31 and 31' are connected in a refrigeration system having a single compressor 33, condenser 34 and a liquid receiver 35. A high pressure liquid refrigerant line 36 connects the outlet from the receiver 35 to separate branch lines 37 and 37′ leading to the inlet ends of the evaporator coils 31 and 31′. The opposite or outlet ends of the evaporator coils 31 and 31′ are connected by separate return lines 38 and 38′ to a main line 39 which, in turn, is connected to the low-pressure suction side of the compressor 33. Each refrigerant return line 38 and 38′ contains a super heater 41 and 41′ comprising a plurality of successive helical turns to insure evaporation of the liquid refrigerant before it is delivered to the compressor 33. The high pressure side of the compressor 33 is connected by a line 40 to the inlet end of the condenser 34 and the outlet end of the condenser is connected to the liquid receiver 35.

The flow of liquid refrigerant to each evaporating coil 31 or 31′ is controlled by normally closed control valves 42 and 42′ in the separate branch supply lines 37 and 37′, respectively. Each normally closed valve 42 and 42′ is electrically operated to open position by a solenoid winding 69 or 69′ when energized, see FIGURE 4. Thus, each of the evaporating coils 31 and 31′ can operate to refrigerate its respective compartments 11 and 12 only when its control valve 42 or 42′ is moved to open position by the energization of its respective solenoid winding 69 or 69′. Furthermore, valve 42 is moved to open position when compartment 11 is to be cooled at a temperature either above or below freezing, but remains closed when the compartment is to be heated; and valve 42′ is opened when compartment 12 is to be cooled at a temperature either above or below freezing, but remains closed when the compartment is to be heated.

Separate thermostatically controlled switches are provided in each compartment 11 and 12 of a number corresponding to each of the freezing, cooling or heating conditions desired. For purposes of illustration, three such switches 43, 44 and 45 are shown for compartment 11 to produce and maintain freezing, cooling and heating conditions; and three corresponding switches 43′, 44′ and 45′ are provided for compartment 12. The thermostatically operated switches 43 and 44 are operative to open the refrigerant valve 42 when a cooling or freezing condition is desired while thermostatic switch 45 is operative only to connect the heating element 32 for energization when heating is desired. Thermostatic switches 43′ and 44′ control the operation of control valve 42′ for compartment 12 while thermostatic switch 45′ controls the operation of heating elements 32′.

The thermostatic switches 43, 44, 45 and 43′, 44′ and 45′ are of substantially identical and conventional construction so that a description of one will suffice for the others. For the purpose of illustrating its function, switch 43 for controlling the valve 42 and compressor 33 to produce and maintain a freezing temperature in compartment 11 is shown diagrammatically in FIGURE 3. As shown, switch 43 comprises a sensing element 43a positioned in the recess 20 below the drain pan 28 to sense the temperature of the air in the compartment 11 and a responsive element 43b in the form of a bellows engaging one side of a pivoted switch arm 43c having a contact 43d engaging a fixed contact 43e. A spring 43f acts on the other side of the switch arm and is manually adjustable by a set screw 43g to vary its compression and the freezing temperature at which the spring opens the contacts 43d and 43e against the action of bellows 43b and thereby cause valve 42 to close. Thermostatic switch 44 is identical with switch 43, but adjusted to open the contacts at a higher cooling temperature of, for example, 40° F. Thermostatic switch 45 has its contacts reversed with respect to its switches 43 and 44 to open the contacts at a predetermined high temperature. The thermostatic switches 43 and 44 are initially adjusted for the particular freezing and cooling temperatures, but switch 45 may be adjusted at any time to vary the heating temperature. To this end the adjusting screw 45g is located at a readily available position on the cabinet for manual adjustment, see FIGURE 1. The thermostatic switches 43′, 44′ and 45′ are identical with the switches 43, 44 and 45 but connected to control the operation of the valve 42′ for the evaporator coil 31′ in the compartment 12.

The flow of liquid refrigerant to either evaporator coil 31 or 31′ is automatically metered by a thermostatically operated valve 46 or 46′ to maintain its evaporator coil flooded but prevent liquid refrigerant from overflowing therefrom. The thermostatically operated valve 46, for example, has a temperature sensitive element 46a which feels the temperature of the refrigerant flowing from the evaporator coil and a temperature responsive element connected to operate the valve 46. The temperature responsive element 46b is subjected to the temperature in the compartment 11 while the sensing element 46a is subjected to the temperature at the outlet from evaporator coil 31 and the thermostat operates at a particular temperature differential to regulate and meter the flow of liquid refrigerant to the coil. If the temperature difference increases due to liquid refrigerant overflowing from the evaporator coil, the valve 46 is operated to reduce the flow of liquid refrigerant. If the temperature differential decreases due to a limited supply of liquid refrigerant in the coil, the valve is operated to increase the supply of refrigerant.

FIGURES 4 to 7 illustrate the electric control for selectively controlling the system illustrated in FIGURE 3 to heat, cool or freeze in each compartment 11 and 12 independently of the other compartment. In general the electric control comprises a selective switch 50 or 50′ for each compartment which controls circuit branches connected to the heating element 32 or 32′, the compressor 33, and control valves 42 and 42′, respectively. The selective switches 50 and 50′ for the different compartments 11 and 12 are conveniently located for manual operation in the compartment which they control, see FIGURE 1, and have separate contacts for closing selected circuit branches for a heating, cooling or freezing. As the branch circuits and selective switch 50′ for compartment 12 are identical with the selective switch 50 and branch circuits for compartment 11, a description of switch 50 should be sufficient.

In the illustrated embodiment, selective switch 50 has a central contact arm 51 movable to four different positions. One of the positions is an "off" position and the other three positions are indicated for purposes of illustration as "0° F.", "40° F." and 150° F." and each of the three operating positions has a fixed contact 52, 53 and 54, respectively, adapted to be engaged by the central contact arm 51. It will be understood, however, that the control may include any desired number of temperature positions and that the system is intended to include freezing temperatures below zero as well as heating temperatures above 200° F. Central contact arm 51 of selective switch 50 is connected to one side L1 of a power line and each of the fixed contacts 52, 53 and 54 is connected through parallel branch circuits 52a, 53a and 54a containing different colored lamps 55, 56 and 57 to the other side of line L2. For example, branch circuit 52a connected to contact 52 at the 0° F. position may contain a green lamp 55, the branch circuit 53a connected to contact 53 at the 40° F. position may contain a red lamp 56 and the branch circuit 54a connected to contact 54 at the 150° F. position may contain a blue lamp 57. As illustrated in FIGURE 1, the lamps 55, 56 and 57 are positioned on the mullion 13 of the cabinet 10 adjacent the compartment 11 or 12 and a lighted lamp of a particular color indicates the particular condition of operation in each individual compartment, such as freezing, cooling or heating.

The contact 52 at the 0° F. position also has a circuit branch 52b connected thereto including thermostatic switch 43, see FIGURE 3, and the circuit is completed through a timing relay 60 including a normally closed switch 61, conductor 62 through winding 63 of a solenoid operated double-pole single-throw relay 64 and then through conductors 65 and 66 back to the other side of line L2. When switch arm 51 is in engagement with contact 52 and thermostatic switch 43 is closed, the relay winding 63 is energized and closes the two pole relay switch 64. Upon closure of relay switch 64, a branch circuit 52c is completed from 52b through pole 67, conductor 68, solenoid winding 69 of control valve 42, see FIGURE 3, and conductors 70 and 66 to the other side L2 of the line. Simultaneously, a branch circuit 52d is completed through the other pole 71 of relay switch 67 and conductor 72 to compressor 33 and from the compressor through a conductor 73 to the other side of the line L2. Another branch circuit 52e from contact 52 of selective switch 50 is completed to a clock 76 of the timer relay 60 and the circuit to the clock is completed through a conductor 77 to the other side of the line L2. Thus, whenever the movable contact 51 of the selective switch 50 is moved to the 0° F. position to engage contact 52 the operation of the clock is initiated. The timer relay 60 has the normally closed switch 61 in branch circuit 52b and a normally open switch 78 connected in a branch circuit 52f from branch 52e and including the winding 80 of a solenoid operated switch 81, and branch circuit 52e is completed through a conductor 82 to the other side of the line L2. After a predetermined time period, for example, 12 hours, clock 76 of timer relay 60 opens the normally closed switch 61 to stop operation of compressor 33 and release control valve 42 which moves to closed position; and close the normally open switch 78 to energize coil 80 and close relay switch 81. Relay switch 81 closes a branch circuit 52g to the heating element 32 so that the refrigeration system is stopped and the heating element is energized to defrost the evaporating coil 31.

The fan 26 for circulating air over the heat exchange unit 27 in the compartment 11 is continuously operated except during a defrosting cycle when freezing. The electric motor for fan 26 is energized by a branch circuit comprising a conductor 85 from the central contact arm 51 of the selector switch 50 which is connected to one side L1 of the power line. The fan circuit includes a manually operated switch 86 and a normally closed relay switch 87 in the conductor 85. The solenoid winding 88 of the relay switch 87 is connected to the timer relay 60 and is energized only when the clock 76 closes switch 78 to stop the fan 26 and energize the heater 32 for a short defrosting period every 12 hours.

Figure 4:
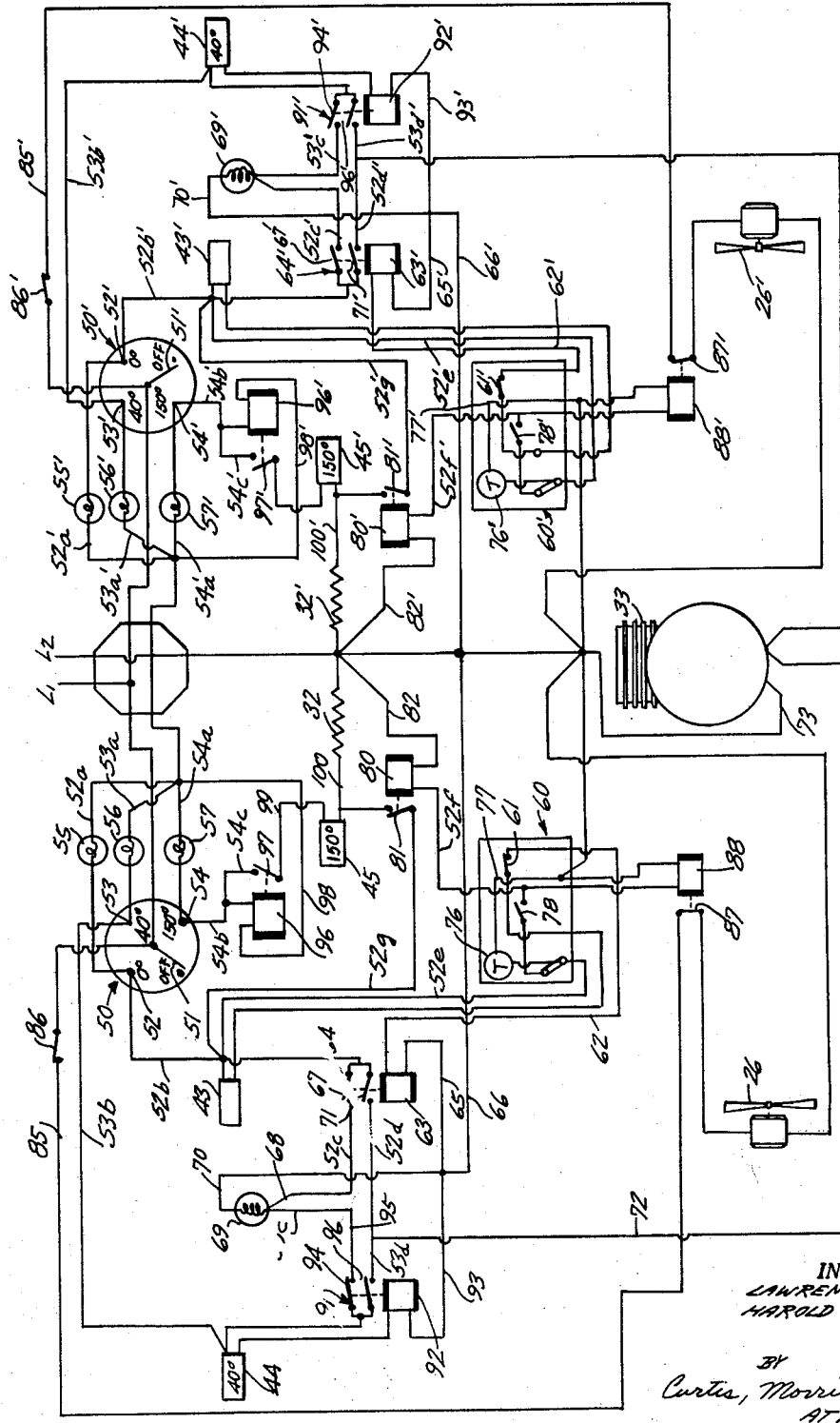
FIGURE 4 is a diagrammatic view of the electric control for selectively operating the system to individually heat, cool or freeze in the separate compartments.
Figure 5:
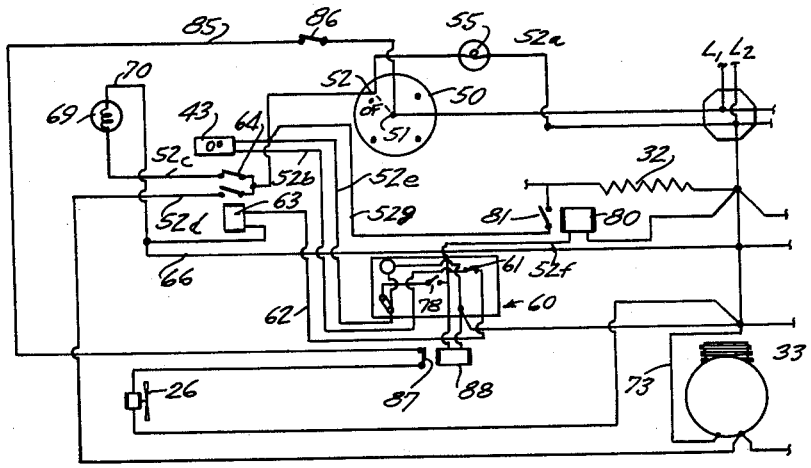
FIGURE 5 is a diagrammatic view of the portion of the electric control for one compartment of the cabinet and showing the circuits controlled when a freezing operation is selected.
Figure 6:
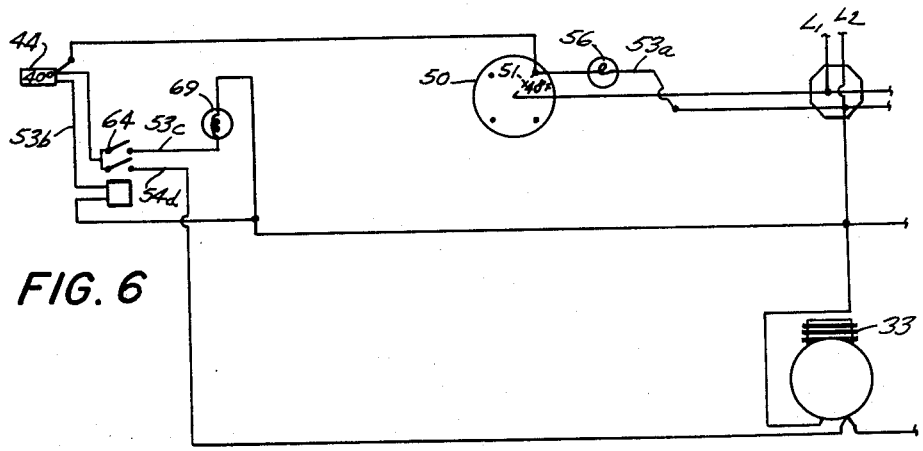
FIGURE 6 is a view similar to FIGURE 5 showing the circuits controlled when a cooling operation above freezing is selected.

The circuit branches for producing a cooling temperature in compartment 11 of, for example, 40° F. when the arm 51 of the selective switch 50 is moved into engagement with the contact 53 are illustrated in FIGURES 4 and 6. These circuit branches are similar to the circuit branches previously described. Immediately upon engagement of switch arm 51 with contact 53, a circuit is completed through branch 53a to light the red lamp 56 indicating that the compartment 11 is being cooled at 40° F. The branch circuits comprise a branch circuit 53b from contact 53 including the thermostatic switch 44 and solenoid winding 92 for operating the double-pole relay switch 91 to closed position. Branch circuit 53b is completed, when the thermostatic switch 44 is closed, through a conductor 93 and the conductor 66 to the other side of the line L2. Upon closure of relay switch 91, pole 94 closes a branch circuit 53c to open control valve 42, see FIGURE 3, to supply liquid refrigerant to the evaporator coil 31. This branch circuit comprises a conductor 95 connecting the pole to the solenoid winding 69 and the circuit is completed through the conductors 70 and 66 to the other side of the line L2. The pole 96 of relay switch 91 completes a branch circuit 53d to the motor for operating compressor 33 to initiate operation of the compressor simultaneously with the opening of the control valve 42. This branch circuit 53d is completed to the compressor motor through conductor 72 and from the compressor motor to the other side of the line L2 through the conductor 73. Thus, when the thermostatic switch 44 is closed to energize solenoid 92 and close relay switch 91, refrigerant is supplied to the evaporating coil 31 and evaporated at a low pressure and temperature by suction of the compressor 33; and when the thermostatic switch 44 opens at a predetermined temperature above freezing, the relay switch 91 opens to close the control valve and stop operation of the compressor.

Figure 7:
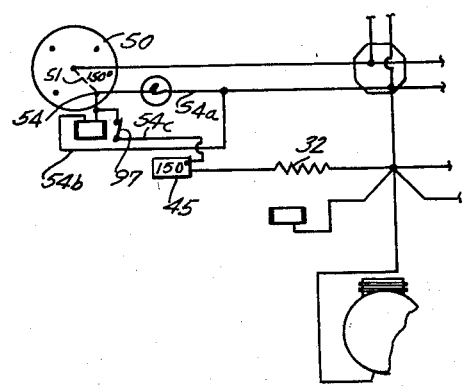
FIGURE 7 is a diagrammatic view showing the circuits controlled when a heating operation is selected.

The circuit branches for producing a heating operation when the movable arm 51 of selective switch 50 is moved into engagement with the contact 54 at the 150° F. position are illustrated in FIGURES 4 and 7. Immediately upon engagement of the movable contact arm 51 with the contact 54 a circuit is completed through the branch 54a and blue lamp 57 to indicate that the compartment 11 is being heated. A circuit 54b also is completed through the winding 96 of a solenoid operated relay switch 97 and from the solenoid winding through a conductor 98 to the other side of the line L2. Energization of the solenoid winding 96 closes relay switch 97 which completes a branch circuit 54c including the thermostatic switch 45 and heating element 32 in series. The branch circuit 54c comprises a conductor 99 from the relay switch 97 to one side of the thermostatic switch 45 and a conductor 100 connecting the other side of the thermostatic switch to the heating element 32. The opposite end of the heating element 32 is connected to the other side of the line L2 to complete the circuit. Thus, the heating element 32 heats the air circulated in the compartment 11 by the fan 26 and the heating of the air is augmented by the heat conducting fins 30. When the temperature of the air in the compartment 11 exceeds the temperature at which the thermostatic switch 45 is set, for example, 150° F., the thermostatic switch 45 opens to deenergize the branch circuit containing the heating element 32. As soon as the temperature in the compartment 11 falls below the particular temperature the thermostatic switch 45 again closes to energize the heating element 32.

The branch circuits of the electric control for the compartment 12 are identical with those described for the compartment 11 and are indicated in FIGURE 4 by the same reference characters with a prime suffix. Thus, the heat exchange unit 27 for the compartment 11 and unit 27' for the compartment 12 may operate simultaneously to produce heating, cooling or freezing operations in both compartments, or a heating, cooling or freezing operation in any of the different compartments. To this end, the compressor 33 and condenser 34 are of sufficient size to carry the maximum load, for example, freezing in both compartments. One form of the invention having now been described in detail, the mode of operation is next explained.

Assuming, for the purpose of description, that the compartment 12 is to be operated as a freezer while the compartment 11 is to be operated as a heater. To this end, the selector switch 50' in compartment 12, see FIGURE 1, is manually adjusted to the 0° F. position to engage the movable contact arm 51', see FIGURE 4, with the contact 52'. Selector switch 50 in compartment 11, corresponding to switch 50' illustrated in compartment 12 in FIGURE 1, is manually adjusted to the 150° F. position to engage its contact arm 51 with contact 54. Also, the adjusting element 45g is manually adjusted to produce the particular heating temperature desired. Portable racks containing the articles of food to be heated and frozen, respectively, are then rolled into the compartments 11 and 12 and the doors 15 and 16 closed.

Upon engagement of the movable contact arm 51' of the selector switch 50' with the contact 52', a circuit is completed through the branch 52a' including the green light 55' on the mullion 13 at the exterior of the cabinet 10 which indicates that the compartment 12 is operating as a freezer. Assuming that the temperature in the compartment 12 is above freezing, the thermostatic switch 43', see FIGURE 3, will be closed to complete branch circuit 52c' through pole 67' of relay switch 64' and solenoid winding 69' to open the refrigerant control valve 42' and supply refrigerant to the evaporating coil 31'. Simultaneously, another branch circuit 52d' is completed through the pole 71' of the relay switch 64' to initiate operation of the compressor 33. Thus, liquid refrigerant is supplied from the receiver 35 through the branch line 37' to the evaporator coil 31' and the supply of liquid refrigerant is regulated by the thermostatically operated control valve 46' to maintain the evaporator coil flooded with refrigerant.

The compressor 31 will withdraw refrigerant vapor from the evaporator coil 31' to cause the liquid refrigerant to evaporate therein at a low pressure and temperature. Air is continuously circulated over the evaporator coil 31' by the fan 26' to cool the air in the compartment 12. This operation continues with the temperature of the air continuously falling until a low freezing temperature of, for example, 0° F. exists at which time the thermostatically operated switch 43' opens the circuit to the solenoid winding 63' of the double-pole relay switch 64'. Relay switch 64' then opens to open the branch circuits 52c' and 52d' to both the control valve 42' and compressor 33. Upon deenergization of the branch circuits 52c' and 52d' the control valve 42' closes and the compressor 33 stops. However, the fan 26 continues to operate to circulate air over the evaporator coil 31' and this operation continues until the temperature rises above 0° F., at which time the thermostatic switch 43' again closes to energize the branch circuits for opening the control valve 42' and initiating operation of the compressor 33. Thus, the refrigeration system is controlled to produce and maintain a freezing temperature in the compartment 12.

During such operation, frost is apt to accumulate on the evaporator coil 31'. At predetermined intervals of, for example, 12 hours the clock 76', see FIGURE 4, of the timer relay 60' opens switch 61' in the line from the thermostatic switch 43' to the solenoid winding 63' of the relay switch 64 which stops operation of the refrigeration system; and closes switch 78' to connect the heating coil 32' for energization. Closing of the switch 78' also energizes the solenoid winding 88' of the relay switch 87' to stop operation of the fan 26'. The defrosting operation continues for a short period of time necessary to defrost the evaporator coil 31' and the drip from the melted frost flows to the drip pan 28'. After a defrosting cycle has been completed, the clock 76' of the timer relay 60' releases switch 61', which moves to closed position, and switch 78' which moves to open position, to disconnect the heater 31 and again initiate a freezing operation in compartment 12.

Simultaneously with the freezing in the compartment 12 the compartment 11 is being heated at a high temperature by the heating element 32. Upon engagement of the movable contact 51 of the selector switch 50 with the contact 54 a circuit is immediately completed through the branch 54a to light the blue lamp 57 to indicate that the compartment 11 is being heated. Simultaneously, a branch circuit 54b is completed through the solenoid winding 96 to close the relay switch 97 which completes a branch circuit 54c through the thermostatic switch 45 and heating element 32. The heat from the electrically energized heating element 32 is then transferred to the air circulated in the compartment 11 by the fan 26. When the temperature of the air in compartment 11 exceeds the predetermined heating temperature desired such as, for example, 150° F. the thermostatic switch 45 opens the circuit to the heating coil 32. When the temperature in compartment 11 falls below the predetermined temperature desired the thermostatic switch 45 again closes. Thus, a heating temperature is produced and maintained in the compartment 11 at the same time a freezing condition is maintained in the compartment 12.

Thus, by merely moving the selector switches 50 and 50' for the separate compartments 11 and 12 to a particular position any desired operating condition can be produced in the separate compartments. For example, both compartments may be operated on freezing, cooling or heating or each compartment individually heated or cooled.

It will now be observed that the present invention provides a food storage compartment which may be maintained at different temperatures in a range from below 0° F. to 200° F. and immediately shifted from operation at one temperature to operation at another temperature. It also will be observed that the present invention provides a system for producing either heating, refrigerating or freezing temperatures in a food storage compartment by merely operating a single switch. It will further be observed that the present invention provides a cabinet having separate compartments operable at the same or different temperatures by merely operating a single switch for the particular compartment. It will further be observed that the present invention provides an improved heating and cooling system for use with a food storage cabinet to selectively heat, cool or freeze in any one of a plurality of separate compartments. It will still further be observed that the present invention provides a food storage cabinet adapted to be operated at different selected temperatures which is of simple and compact construction, economical to manufacture and reliable in operation.

While a single embodiment of the invention is herein illustrated and described, it will be understood that changes may be made in the construction and arrangement of elements without departing from the spirit or scope of the invention. Therefore, without limitation in this respect the invention is defined by the following claims.

We claim:

1. A system for subjecting food products to different temperatures in a range from below 0° F. to above 200° F. comprising a food storage compartment with insulated walls to maintain freezing temperatures therein and having an access door, a coil for evaporating refrigerant and an electric heating element in the compartment, a refrigeration system comprising a compressor, a condenser, a refrigerant metering valve and the evaporator coil in the compartment which are connected to evaporate refrigerant in the coil at a low pressure and temperature to cool the compartment, a normally closed solenoid-operated control valve in the refrigeration system between the condenser and evaporator coil for controlling the supply of refrigerant to the latter, an electric control circuit having branches connected to the compressor, the solenoid for operating the control valve for the refrigeration system and heating element, respectively, at least two separate branch circuits being connected to the compressor to selectively operate the refrigeration system so as to maintain the compartment refrigerated at temperatures above and below freezing, respectively, a selector switch operable to selectively connect the branches in different circuits, a thermostatic switch in each of the branch circuits connected to the compressor and the electric heating element selectively closed by the selector switch, and said plurality of thermostatic switches being responsive to the temperature in the compartment and set to operate at different temperatures to start and stop the compressor and electric heating element to produce and maintain different temperatures in the compartment whereby to hold food products frozen until they are to be used, thaw the products while maintaining them refrigerated and preheating the products prior to cooking all in the same compartment without handling.

2. A system in accordance with claim 1 in which the refrigerant evaporating coil and electrical heating element in the compartment are combined in a single unit having spaced heat transfer fins, and the evaporating coil and heating element extending through the fins in thermal contact therewith.

3. A system in accordance with claim 1 in which the refrigerant metering valve comprises a thermostat having a sensing element responsive to the temperature of the refrigerant leaving the evaporator coil and a responsive element subjected to the air temperature in the compartment, said metering valve being operated by changes in the temperature difference of the refrigerant and compartment to maintain the evaporator flooded with refrigerant, and the thermostatic switches in certain of the circuit branches controlled by the selection switch being responsive to the air temperature in the compartment and controlling the operation of the solenoid-operated valve to control the supply of any refrigerant to the evaporator.

4. A system in accordance with claim 1 in which the selector switch has contacts engaged at one position to connect the branch circuits to the compressor and control valve, and contacts engaged at another position to connect the branch circuit to the heating element.

5. A system in accordance with claim 1 in which the selector switch has three positions with contacts engaged at one position to connect branch circuits to the compressor and control valve having a thermostatic switch set to open the branch circuits when the temperature in the compartment falls below a predetermined freezing temperature, contacts engaged at another position which connect branch circuits to the compressor and control valve having a thermostatic switch set to open when the temperature in the compartment falls below a predetermined cooling temperature above freezing, and contacts engaged at another position to connect a branch circuit to the heating element and having a thermostatic switch set to open when the temperature in the cabinet exceeds a predetermined heating temperature.

6. A system in accordance with claim 1 in which the evaporator coil and heating element are located in a recess in the compartment having a baffle forming a flue open at the top and bottom, a fan for circulating air through the flue in the compartment, and a branch of the electric control connected to the fan.

7. A system in accordance with claim 6 in which the branch of the electric control connected to the fan has a solenoid-operated relay switch, the refrigerant evaporating coil and electric heating element are combined in a single heat transfer unit having spaced fins in heat exchange relation to the coil and heating element, the thermostatic switch in certain branches selectively connected in a circuit by the selector switch operating the refrigeration system to produce and maintain a freezing temperature in the compartment, a timing relay in the electric control operable after a period of time to open a switch in the selected branches to close the refrigerant control valve and stop the compressor and close a switch to operate the relay switch in the fan circuit to stop the fan and connect the heating element for operation to defrost the heat transfer unit.

8. A system for maintaining food products at any of a plurality of selected temperatures in a range from below 0° F. to above 200° F. comprising a food storage cabinet having separate compartments with separate access doors, a heat transfer unit in each compartment of the cabinet having a refrigerant evaporator coil and electric heating element, a refrigeration system comprising a compressor, a condenser, the evaporator coils in the compartments and a metering valve for each evaporator coil, said refrigerant system having separate refrigerant lines connecting the condenser to each of the evaporator coils in the plurality of compartments, respectively, and separate return lines from the evaporator coils to the compressor, a normally-closed solenoid-operated control valve in each of the separate refrigerant lines from the condenser to the evaporator coils for separately controlling the supply of any refrigerant to each of the plurality of evaporator coils, an electric control having separate sets of branches for each compartment connected to the compressor, the solenoids for operating the control valves and the heating elements, respectively, at least two separate branch circuits for each compartment being connected to the compressor to selectively maintain each compartment refrigerated at temperatures above and below freezing, a selector switch for each set of branches of the control circuit for selectively connecting the branches of its set in different circuits, a thermostatic switch in each of the circuits selectively closed by its selector switch, and said plurality of the thermostatic switches controlled by one selector switch being responsive to the temperature in the compartment and set to operate at different temperatures to start and stop operation of the compressor and electric heating element to produce and maintain different temperatures in a particular compartment whereby both compartments may be cooled at the same or different temperatures or one compartment may be cooled while the other is being heated.

9. A system in accordance with claim 8 in which each selector switch for a particular compartment has contacts at one position for connecting branch circuits to the compressor and control valve, and contacts at another position for closing a branch circuit connected to the heating element.

10. A system in accordance with claim 8 in which the selector switch for each compartment is manually operable to at least three positions, circuit branches at each of the three positions which are closed by the selector switch, the circuit branches at one position being connected to the compressor and refrigerant control valve to the evaporator coil of one heat transfer unit and having a thermostatic switch operable to open the branch circuits at a predetermined low temperature to produce a freezing temperature in one compartment, the circuit branches at another position being connected to the compressor and refrigerant control valve and having a thermostatic switch operable at a higher temperature to produce a cooling temperature in the compartment above freezing, and a circuit branch at a third position connected to the heating element of the heat transfer unit and having a thermostat operable at a still high temperature to produce a heating temperature in the compartment.

11. A system in accordance with claim 8 in which the cabinet has a transverse wall separating a cabinet into separate compartments, said transverse wall being offset to provide adjacent recesses in the separate compartments, the heat transfer unit for each compartment being located in the recess therein, a baffle overlying the open side of the recess to provide a flue in each compartment open at the top and bottom, a fan for circulating air through the flue in each compartment and branches of the electric control connected to operate the fans.

References Cited in the file of this patent

UNITED STATES PATENTS

| 2,030,945 | Smith et al. | Feb. 18, 1936 |
| 2,049,329 | Smith | July 28, 1936 |
| 2,110,367 | Knudson | Mar. 8, 1938 |
| 2,133,872 | Roessler | Oct. 18, 1938 |
| 2,151,995 | Smith | Mar. 28, 1939 |
| 2,793,834 | Henney et al. | May 28, 1957 |
| 2,806,674 | Biehn | Sept. 17, 1957 |
| 3,015,220 | Elfrnig | Jan. 2, 1962 |